UNITED STATES PATENT OFFICE.

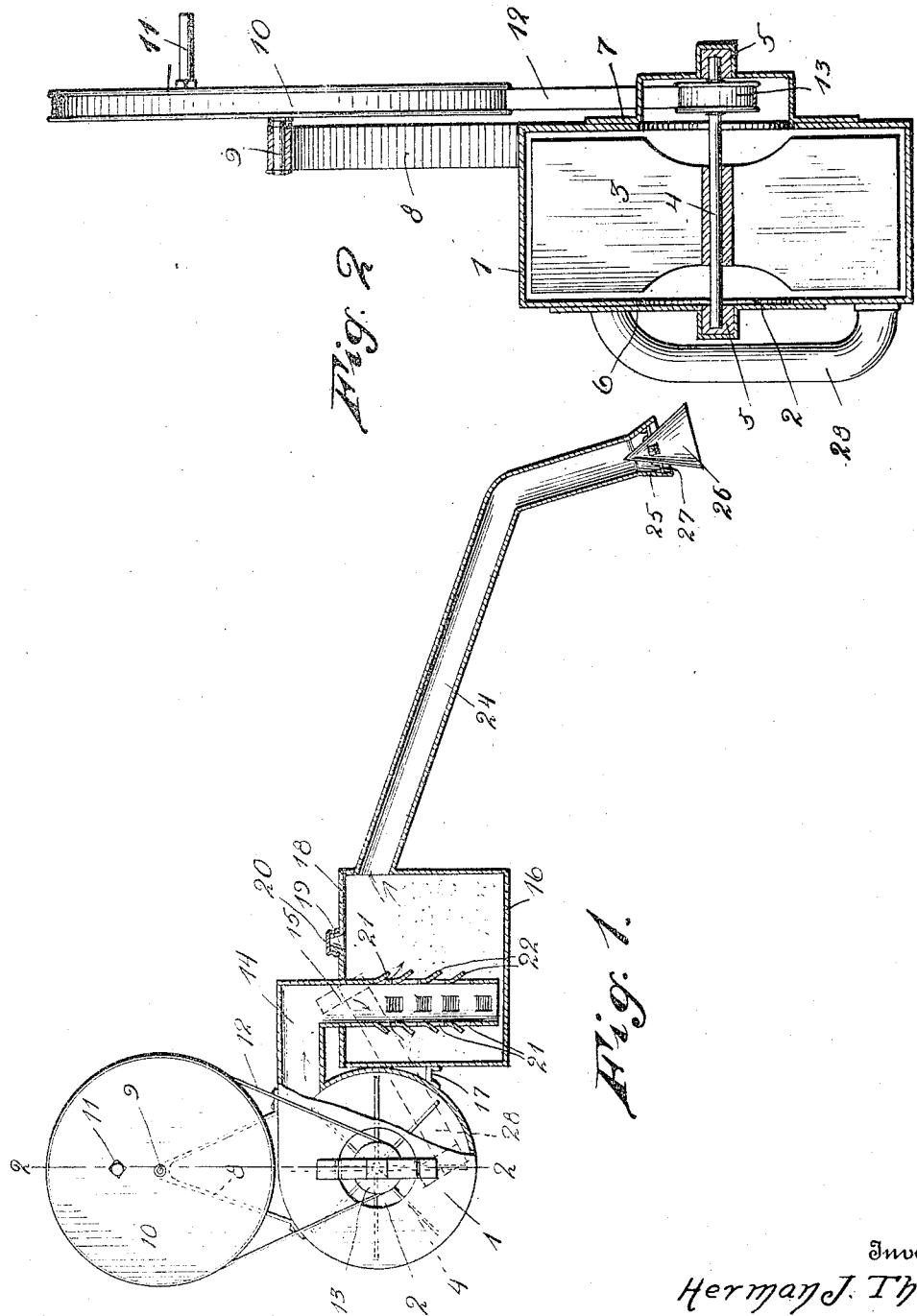

HERMAN J. THEIM, OF HOBART, NEW YORK.

MACHINE FOR APPLYING INSECTICIDE.

999,275. Specification of Letters Patent. Patented Aug. 1, 1911.

Application filed April 13, 1911. Serial No. 620,843.

*To all whom it may concern:*

Be it known that I, HERMAN J. THEIM, a citizen of the United States, residing at Hobart, in the county of Delaware and State of New York, have invented certain new and useful Improvements in Machines for Applying Insecticide, of which the following is a specification.

My invention relates to a machine for applying Paris green or other insecticides to plants which are infected with insects.

An important object of this invention is to provide a portable machine for the purpose specified, which is simple in construction, cheap to manufacture, and not liable to derangements.

Other objects and advantages of this invention will be apparent during the course of the following description.

In the accompanying drawings forming a part of this specification and in which like numerals are employed to designate like parts throughout the same, Figure 1 is a side view of my machine, parts thereof being shown in section, and, Fig. 2 is a vertical cross-sectional view taken on line 2—2 of Fig. 1.

In the drawings wherein is illustrated a preferred embodiment of my invention, the numeral 1 designates the shell or casing of a centrifugal blower, the side walls of the shell being provided with centrally arranged air inlets 2. A rotatable fan 3 is disposed within the shell or casing 1 and is rigidly mounted upon a shaft 4, which is journaled at its opposite ends in bushings 5 formed of Babbitt-metal or other suitable material. The bushings 5 are rigidly held by metal straps 6 and 7, which are soldered or otherwise attached to the side walls of the shell 1. An upright or support 8 is rigidly connected with the upper end of the shell 1 and supports at its upper end a stub-staff 9, carrying a rotatable grooved pulley 10. This pulley is provided with a crank or handle 11, whereby the same may be manually rotated. A belt 12 is trained about the pulley 10 and extends downwardly for engagement with a smaller grooved pulley 13, which is fast upon the shaft 5. The pulley 13 operates within the strap 7, such strap being properly off-set to provide a space for said pulley. The shell or casing 1 is provided near its periphery with a horizontal discharge pipe 14, to which is connected a downwardly extending vertical pipe 15.

Disposed near the shell or casing 1 is a receptacle 16 for holding Paris green or other insecticides, such receptacle being rigidly connected with the shell 1 through the medium of a bracket 17 and by virtue of the fact that the pipe 15 extends through and fits snugly within an opening formed through a lid 18, which closes the upper end of the receptacle 16. This lid is provided with a nipple 19 through which the Paris green may be supplied to the receptacle 16. A cap 20 closes the opening of the nipple 19 and has detachable engagement therewith. The pipe 15 extends vertically within the receptacle 16 and terminates adjacent the bottom of the same. The pipe 15 is provided with a plurality of superposed spaced openings 21, adjacent the upper ends of which are disposed outwardly and downwardly extending tongues 22, serving to deflect the air passing through the openings 20, in a downwardly direction to impinge against Paris green 23 carried in the receptacle. The upper portion of the receptacle 16 has connection with a preferably downwardly inclined pipe 24, the end portion of which is bent at an angle, as shown, and carries a flaring discharge mouth 25. A conical deflector 26 is disposed within the mouth 25 and held in a concentric position with relation thereto by spaced brackets or supports 27.

Upon the side of the shell 1 opposite pulley 13 is a diagonally arranged handle 28, having its upper end rigidly connected with the upper portion of the receptacle 16 and the opposite end thereof rigidly connected with the lower end of the shell 1. The device as a whole is portable and is supported by the operator grasping the handle 28.

In the operation of the machine, the receptacle 16 is partly filled with the Paris green or other insecticide. The operator then places the discharge mouth 25 in proximity to the plant infected with the insects, and turns or rotates the pulley 10. This rotation is imparted to the fan 3, which now discharges air through the pipes 14 and 15. The lower openings 20 are covered or closed by the Paris green 23 and the air is accordingly discharged through the upper uncovered openings 20. The tongues 21 direct this air in a downwardly direction to impinge upon the upper surface of the mass of the Paris green, whereby said air takes up some of the Paris green, which is in the form of powder and conducts the same through the pipe 24. The air laden with the Paris green powder is discharged through the mouth 25 and is spread in an outwardly direction by the deflector 26 to be sprayed upon the plant. As the quantity of the mass of the Paris green 23 decreases, other openings 20 are uncovered and hence air is discharged through them to impinge against the upper surface of said mass.

I wish it understood that the form of my invention herewith shown and described is to be taken as a preferred example of my invention and that certain changes in the shape, size and arrangement of parts may be resorted to without departing from the spirit of the invention or the scope of the subjoined claims.

Having thus described my invention, I claim:—

1. In a machine of the character described, a receptacle for holding an insecticide, discharge means for said receptacle, a conduit disposed within the receptacle and being approximately vertically disposed, said conduit being provided with spaced superposed openings formed therethrough, means to deflect the air passing through said openings in a downward direction, and means to force air through said conduit.

2. In a machine of the character described, a receptacle for holding an insecticide, discharge means for said receptacle, a conduit disposed within the receptacle and being approximately vertically disposed, said conduit being provided with spaced superposed openings formed therethrough and with outwardly extending inclined tongues positioned adjacent the upper end of the openings, and means to force air through said conduit.

In testimony whereof I affix my signature in presence of two witnesses.

HERMAN J. THEIM.

Witnesses:
CHAUNCEY J. HAMILTON,
ANDREW J. MCNAUGHT, Jr.